United States Patent
Kelly

(10) Patent No.: US 9,840,378 B2
(45) Date of Patent: Dec. 12, 2017

(54) AUTOMATED VACUUM ACTUATED CONTROL

(71) Applicant: IPEG, INC., Cranberry Township, PA (US)

(72) Inventor: Raymond Burteen Kelly, Beaver Falls, PA (US)

(73) Assignee: IPEG, Inc., Cranberry Township, PA (US)

( * ) Notice: Subject to any disclaimer, the term of this patent is extended or adjusted under 35 U.S.C. 154(b) by 0 days.

(21) Appl. No.: 15/042,226

(22) Filed: Feb. 12, 2016

(65) Prior Publication Data

US 2016/0236878 A1   Aug. 18, 2016

Related U.S. Application Data

(60) Provisional application No. 62/115,219, filed on Feb. 12, 2015.

(51) Int. Cl.
| | |
|---|---|
| *B65G 53/24* | (2006.01) |
| *B65G 53/66* | (2006.01) |
| *B65G 53/60* | (2006.01) |
| *B65G 53/46* | (2006.01) |

(52) U.S. Cl.
CPC ............. *B65G 53/66* (2013.01); *B65G 53/46* (2013.01); *B65G 53/60* (2013.01)

(58) Field of Classification Search
CPC ........ B65G 53/24; B65G 53/14; B65G 53/60; B65G 53/66; B65G 2812/16
USPC ................... 406/11, 14, 21, 26, 28, 151, 171
See application file for complete search history.

(56) References Cited

U.S. PATENT DOCUMENTS

| | | | | |
|---|---|---|---|---|
| 1,669,084 A | * | 5/1928 | Grindle | B65G 53/06 137/625.11 |
| 2,727,792 A | * | 12/1955 | Bearer | B01J 8/1881 34/526 |
| 3,431,026 A | * | 3/1969 | Russell | B65G 53/00 406/172 |
| 3,638,328 A | * | 2/1972 | Solt | B01J 8/0035 34/369 |
| 3,690,731 A | * | 9/1972 | Mylting | B65G 67/00 406/115 |

(Continued)

FOREIGN PATENT DOCUMENTS

| | | |
|---|---|---|
| CA | 1257301 | 7/1989 |
| EP | 1052483 | 11/2000 |

*Primary Examiner* — Joseph Dillon, Jr.
(74) *Attorney, Agent, or Firm* — Reed Smith LLP

(57) ABSTRACT

A hopper loader having a hopper connected to a vacuum source for applying a vacuum to the hopper to convey material into the hopper through a material inlet. A material separator is disposed between the material inlet and the vacuum source for filtering the material. A material discharge assembly is connected to the hopper and disposed for controlling downwardly gravity flow of the material from the hopper, the material discharge assembly having a material outlet configured to be opened and closed to control the discharge of material from the hopper. A vacuum detector is disposed between the material separator and the vacuum source. A vacuum activated control operatively connected to the vacuum detector and configured to turn off the vacuum source in response to a signal from the vacuum detector.

7 Claims, 7 Drawing Sheets

(56) References Cited

U.S. PATENT DOCUMENTS

| | | | | |
|---|---|---|---|---|
| 3,799,622 | A * | 3/1974 | Hek | B65G 53/24 406/109 |
| 3,954,303 | A | 5/1976 | Boring | |
| 4,043,775 | A * | 8/1977 | Solomon | B01D 46/0068 406/169 |
| 4,225,272 | A * | 9/1980 | Palmovist | B65G 53/66 15/314 |
| 4,357,953 | A | 11/1982 | Patterson | |
| 4,415,297 | A * | 11/1983 | Boring | B65G 53/24 406/168 |
| 4,545,410 | A | 10/1985 | Paul et al. | |
| 4,668,131 | A * | 5/1987 | Hart, Sr. | B65G 53/24 406/164 |
| 4,715,748 | A * | 12/1987 | Krambrock | B65G 53/525 406/11 |
| 4,826,362 | A * | 5/1989 | Hayashi | B65G 53/30 406/109 |
| 4,909,676 | A * | 3/1990 | Heep | B65G 53/521 406/11 |
| 5,221,299 | A | 6/1993 | Boring | |
| 5,265,983 | A * | 11/1993 | Wennerstrom | B01J 4/008 406/124 |
| 5,450,984 | A * | 9/1995 | Rohr | G01G 13/28 222/129 |
| 5,855,456 | A * | 1/1999 | Mueller | B65G 53/525 406/11 |
| 6,062,094 | A | 5/2000 | Carlini et al. | |
| 6,447,215 | B1 * | 9/2002 | Wellmar | B65G 53/66 406/11 |
| 6,786,681 | B2 * | 9/2004 | Grasshoff | B65G 53/521 406/11 |
| 6,964,543 | B2 * | 11/2005 | Gerber | B65G 53/66 406/113 |
| 7,080,960 | B2 * | 7/2006 | Burnett | B65G 43/08 406/11 |
| 8,662,797 | B2 * | 3/2014 | Ruggero | B65G 53/60 406/121 |
| 8,753,432 | B2 | 6/2014 | Maguire | |
| 9,304,510 | B2 | 4/2016 | Hoopes et al. | |
| 9,433,908 | B2 * | 9/2016 | Stevenson | B01F 3/18 |
| 2008/0145155 | A1 * | 6/2008 | Volkmann | B65G 53/00 406/12 |
| 2011/0061738 | A1 * | 3/2011 | Strimling | B65G 53/24 137/1 |
| 2011/0097159 | A1 * | 4/2011 | Haberl | B65F 5/005 406/15 |
| 2011/0211919 | A1 * | 9/2011 | Rasner | B65G 53/66 406/14 |
| 2012/0160866 | A1 * | 6/2012 | Maguire | B65G 53/24 222/1 |
| 2012/0243950 | A1 | 9/2012 | Ruggero et al. | |
| 2016/0096693 | A1 * | 4/2016 | Hanaoka | B65G 53/26 406/19 |
| 2016/0347557 | A1 * | 12/2016 | Tell | B65G 53/24 |
| 2017/0190518 | A1 * | 7/2017 | Maguire | B65G 53/60 |

* cited by examiner

AUTOMATED VACUUM ACTUATED CONTROL

CROSS-REFERENCE TO RELATED APPLICATION

This application claims the benefit under 35 U.S.C. §119 (e) of the earlier filing date of U.S. Provisional Patent Application No. 62/115,219 filed on Feb. 12, 2015, the disclosure of which is incorporated by reference herein.

BACKGROUND

This application discloses an invention which is related, generally and in various embodiments to vacuum loading systems.

In the plastic industry it is common practice to transport material such as plastic pellets from a source of material such as a storage bin to the hopper of a hopper loader by applying a vacuum to the hopper with a vacuum generator. When an appropriate amount of material has been received in the hopper of the hopper loader, the material conveying is discontinued by discontinuing the applied vacuum and thereby permitting the material in the hopper to be gravitationally discharged through a material outlet of the hopper loader in communication with the hopper. Presently, the length of time to convey is determined by either setting a load timer on a control or using a material sensor to determine when the hopper is full. The problem with setting the timer is that 1) it's a manual function that is empirically determined; and 2) changes to the process require adjustment. The problem with using a sensor is that 1) the sensor may be deceived by material clinging to it due to static electricity; 2) the sensor must be in contact with the material or be in "line of sight"; and 3) may be eroded due to contact with the material. The invention seeks to solve the problems associated with determining the proper load time for a hopper loader that are encountered by empirical and material sensing methods.

BRIEF DESCRIPTION OF THE DRAWINGS

For the present invention to be clearly understood and readily practiced, the present invention will be described in conjunction with the following figures, wherein like reference characters designate the same or similar elements, which figures is incorporated into and constitutes a part of the specification.

DETAILED DESCRIPTION

Figure 1:
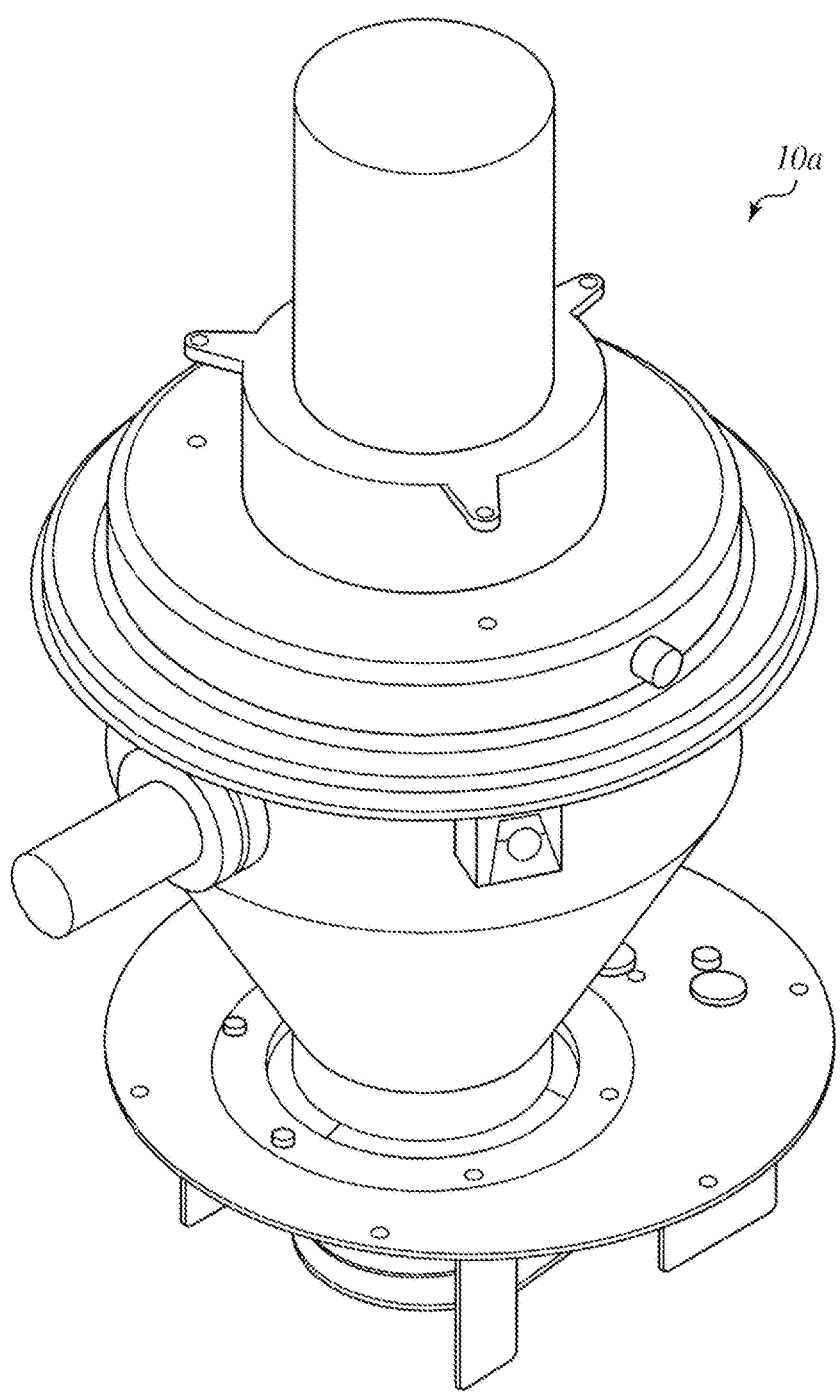
FIGS. 1-3 show perspective and two side views, respectively, of a vacuum loading system according to a vertical axis embodiment of the invention.
Figure 3:
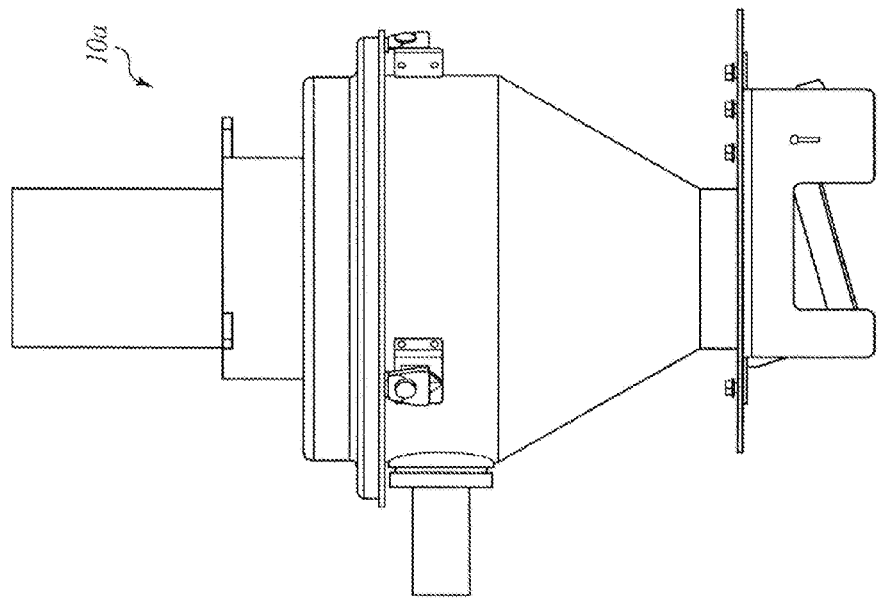
Figure 2:
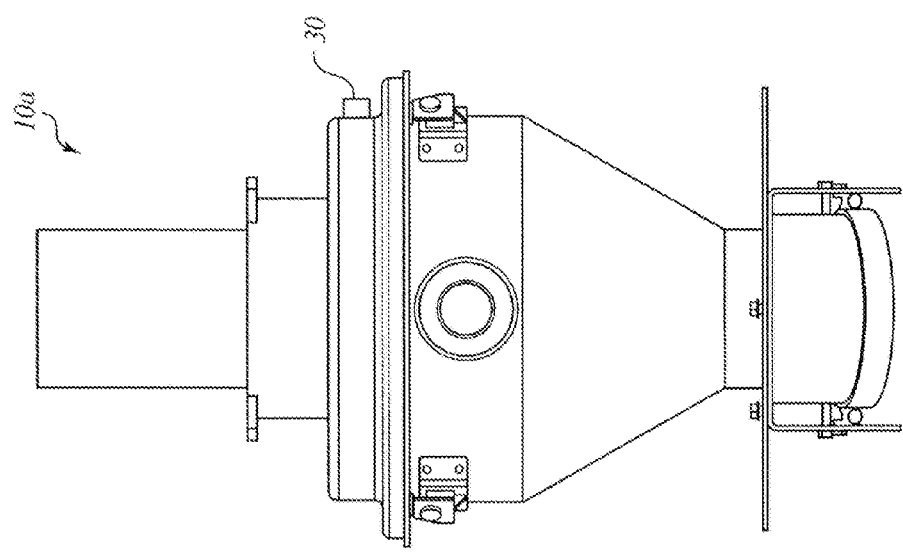

It is to be understood that the figures and descriptions of the present invention have been simplified to illustrate elements that are relevant for a clear understanding of the invention, while eliminating, for purposes of clarity, other elements that may be well known. Those of ordinary skill in the art will recognize that other elements are desirable and/or required in order to implement the invention. However, because such elements are known in the art, and because they do not facilitate a better understanding of the present invention, a discussion of such elements is not provided herein. The detailed description will be provided herein below with reference to the attached drawings.

For purposes of the description hereinafter, the terms "upper", "lower", "vertical", "tilted", "top", "bottom", and derivatives thereof shall relate to the invention, as it is oriented in the drawings. However, it is to be understood that the invention may assume various alternative configurations except where expressly specified to the contrary. It is also to be understood that the specific elements illustrated in the drawings and described in the following specification are simply exemplary embodiments of the invention. Therefore, specific dimensions, orientations and other physical characteristics related to the embodiments disclosed herein are not to be considered limiting.

Referring to FIGS. 1-4a, in one embodiment of the invention, hopper loader 10a comprises a hopper 12 connected a vacuum motor or source 14. In this embodiment, vacuum source 14 is a local vacuum source integral to hopper loader 10a, and hopper loader 10a has a vertical axis. In the embodiments shown in FIGS. 4b to 5b, the vacuum source may be remote and/or the hopper loader may have a tilted axis.

Figure 4A:
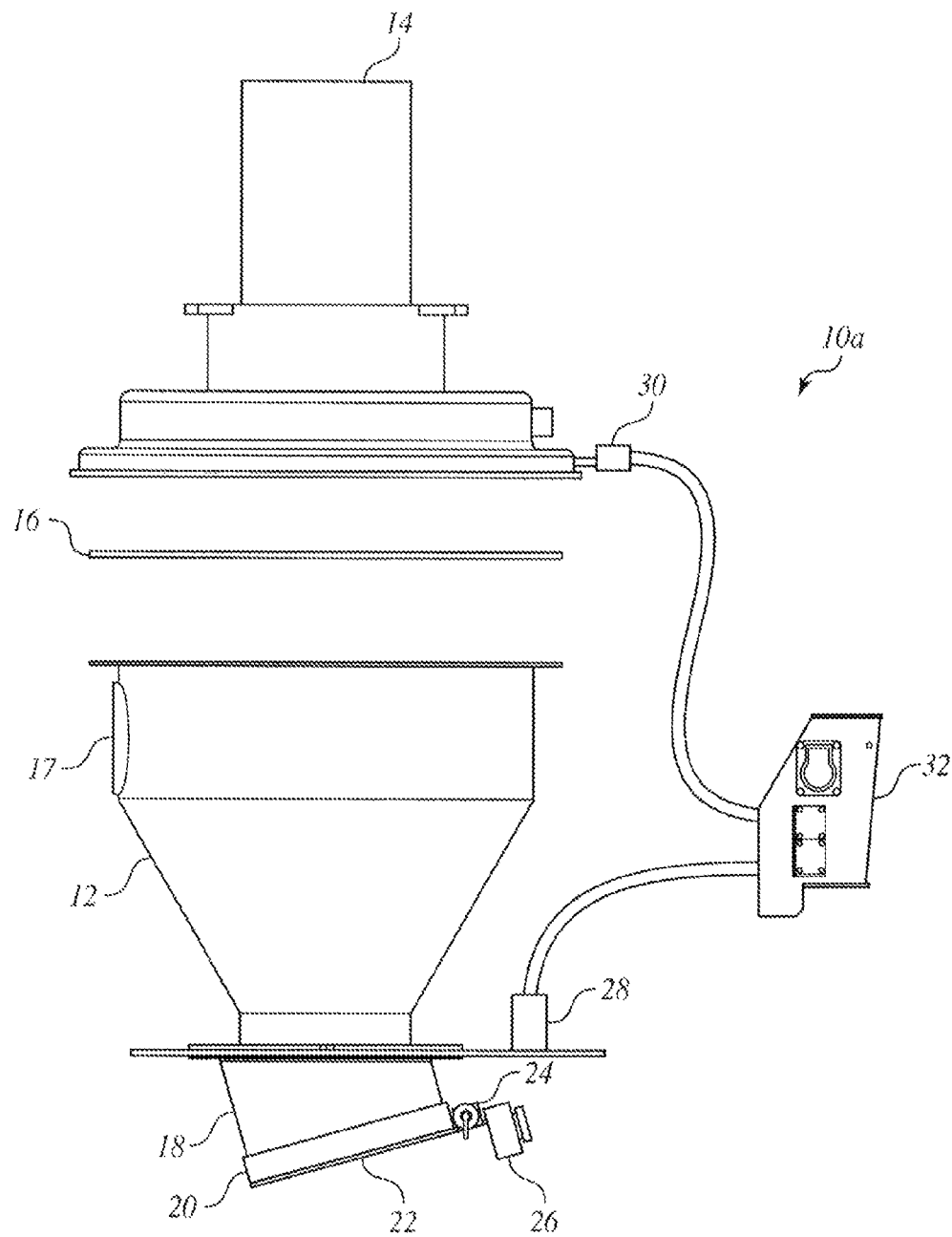
FIG. 4a shows an exploded side view of a vacuum loading system according to a vertical axis embodiment of the invention having it local vacuum source.

Referring to FIG. 4a, hopper loader 10a has an air material separator 16 such as a filter above hopper 12 and below vacuum source 14 such that the material separator 16 is positioned between the hopper 12 and the vacuum source 14. Material separator 16 filters the material to keep dust and other particulate matter, traveling with the material from entering the suction intake of the vacuum source 14. Vacuum source 14 creates a vacuum or suction in hopper 12 to draw material into hopper 12 through a material inlet 17 from a material source (not shown) which may be a source of material such as plastic beads, plastic resins, blended resins, powders, re-grind waste materials, cereal or candy. Hopper 12 has a cylindrical upper section and a frusto-conical lower section which terminates in a material discharge assembly 18 (FIG. 4a) at the base of hopper 12. Material inlet 17 may be connected to the material source by piping (not shown).

Material discharge assembly 18 is located for downward, gravity flow of material from hopper 12. Material discharge assembly 18 has a material outlet 20 which is opened and closed to control the discharge of material from hopper 12. The material discharge assembly 18 includes, for example, a valve plate 22 pivotally carried by a shaft 24 and is moveable between a closed position covering material outlet 20 and an open position away from material outlet 20. The valve plate 22 is biased to the closed position by, for example, a counter weight 26. A material demand sensor 28 is disposed at material discharge assembly 18. Material demand sensor 28 determines whether material is needed. For example, the counterweight 26 is a magnet and the demand sensor 28 is a reed switch that senses the presence of the magnet. In the position shown in FIG. 4a, the hopper 12 is empty and the magnet counterweight 26 is not near the demand sensor 28, so that causes a demand, vacuum source 14 comes on and hopper loader 10a begins filling with material. After the vacuum source 14 stops, the material in hopper loader 10a forces the valve plate 22 open to permit the material to escape. If the bin (not shown) below hopper loader 10a is sufficiently full that the valve plate 20 remains open due to the material not being able to fully discharge from the hopper 12, then the magnet counterweight 26 is sensed by the demand sensor 28 and vacuum source 14 will not come on. When the material level in the bin below hopper loader 10a drops low enough that all the material in the hopper loader 10a is emptied and not holding valve plate 22 open, valve plate 22 will close and move magnet counterweight 26 sufficiently far from demand sensor 28 that the sensor no longer can detect its presence and sense whether the material outlet 20 of the material discharge assembly 18 is closed. This produces a signal that will permit the vacuum source 14 to turn on and begin loading again. Alternatively, demand sensor 28 may be a capacitive proximity device, inductive proximity device, optical sensing device, or a number of other devices capable of sensing an object in close proximity.

A vacuum detector 30 is disposed between air material separator 16 and the suction intake of the vacuum source 14. Vacuum detector 30 senses the vacuum produced by the vacuum source 14 in the hopper 12. When hopper 12 is full of material or has a maximum amount of material, an increase in vacuum is sensed by vacuum detector 30. A minimum increase is required which varies based on vacuum source 14 and hopper 12. When the vacuum first begins, a higher than normal vacuum is sensed by vacuum detector 30, then the vacuum level decreases to a steady state level determined by vacuum source 14, distance material is being conveyed, type of material, and other variables in the system. After this vacuum source 14 will remain close to the steady state value until the hopper 12 is full. At this time, vacuum source 14 will increase sharply in a short period of time and it is this step change in vacuum that is used to determine that hopper 12 is full. Vacuum detector 30 may be a vacuum sensor or a vacuum actuated switch. A vacuum sensor has an analog output indicating the vacuum level of material in hopper 12 between a minimum and maximum. A vacuum actuated switch has an output that indicates the vacuum level is either above or below a predetermined level. How high above or below the predetermined level is not measurable with a vacuum actuated switch, but is with a vacuum sensor. The vacuum detector 30 is only monitored during the time that vacuum source 14 is on. When the vacuum is on and the step function is detected by the vacuum sensor, then the vacuum source 14 is turned off. Discharge assembly 18 is controlled by gravity.

An automated vacuum activated control 32 is operatively connected to the vacuum detector 30 to receive a signal when the vacuum detector 30 signals the hopper 12 of the hopper loader 10a is full or has reached a maximum amount. The vacuum activated control 32 controls the operation or the vacuum source 14 and the opening and closing of the material discharge assembly 18 based on the signal.

Figure 6:
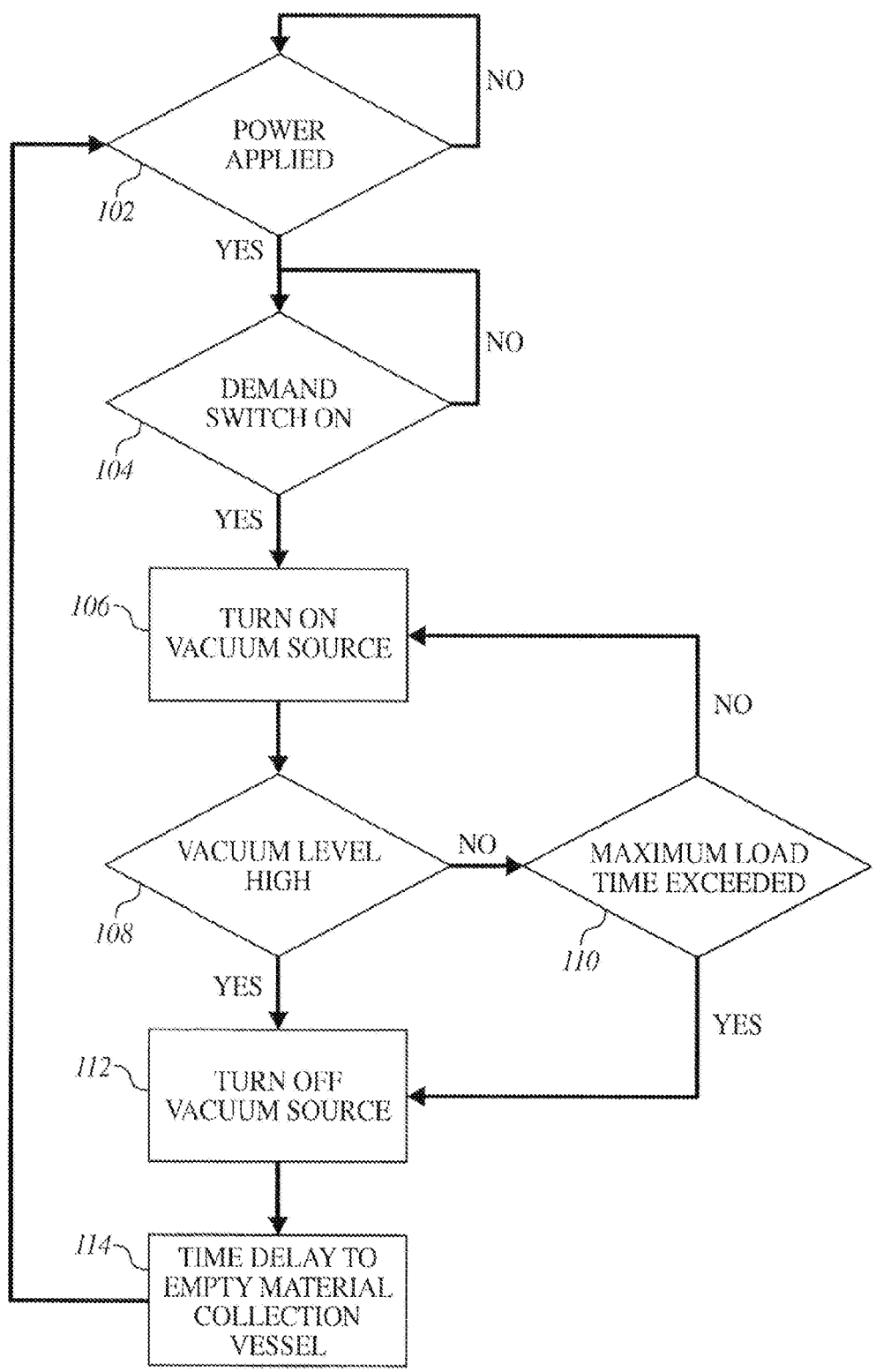
FIG. 6 is a flow chart showing the sequence of operation of the vacuum loading system according to embodiments of the invention.

The sequence of operation of hopper loader 10a is shown in the flow chart illustrated in FIG. 6.

In step 102, power is applied to the hopper loader 10a. This power is the power needed to operate the device. It is, for example, 110 VAC, 220 VAC, 24 VAC, or 24 VDC, however other voltages could be used.

In step 104, if the material demand sensor 28 determines that material is needed vacuum source 14 is turned on (step 106).

The vacuum source 14 will cause material to be conveyed into the hopper 12 from a material source (not shown) through material inlet 17. The vacuum source 14 will stay on until the vacuum level sensed by vacuum detector 30 exceeds a predetermined level (step 108) or a maximum load time (step 110) is exceeded.

Once the maximum load time is exceeded (step 110) or the vacuum level exceeds the maximum predetermined level (step 108), vacuum activated control 32 will turn off vacuum source 14 (step 112).

After the vacuum source 14 is turned off (step 112), vacuum activated control 32 causes a time delay (step 116) to allow the material in the hopper 12 to discharge and then the vacuum activated control 32 returns to step 102. The typical time delay used in the control to empty hopper 12 is 5 seconds. This time is to ensure that the vacuum source 14 has completely stopped and given gravity a chance to pull valve plate 22 open, however if the bin (not shown) below hopper loader 10a is full it may actually take several minutes or longer for hopper 12 to become empty.

This differs from existing technology as it is independent of time and does not rely on sensing the presence of material. This results in a system that will adapt as variations in external parameters take place without the intervention of an operator. This system also does not suffer problems associated with sensing the material, such as "false full" signals created by material clinging to the sensor due to static electricity, sensor circuitry drift causing the sensor to no longer operate properly, sensor adjustments necessary due to variations in the material being sensed, abrasion of sensors in direct contact with material, and variations in opacity when using optical sensors.

Figure 4B:
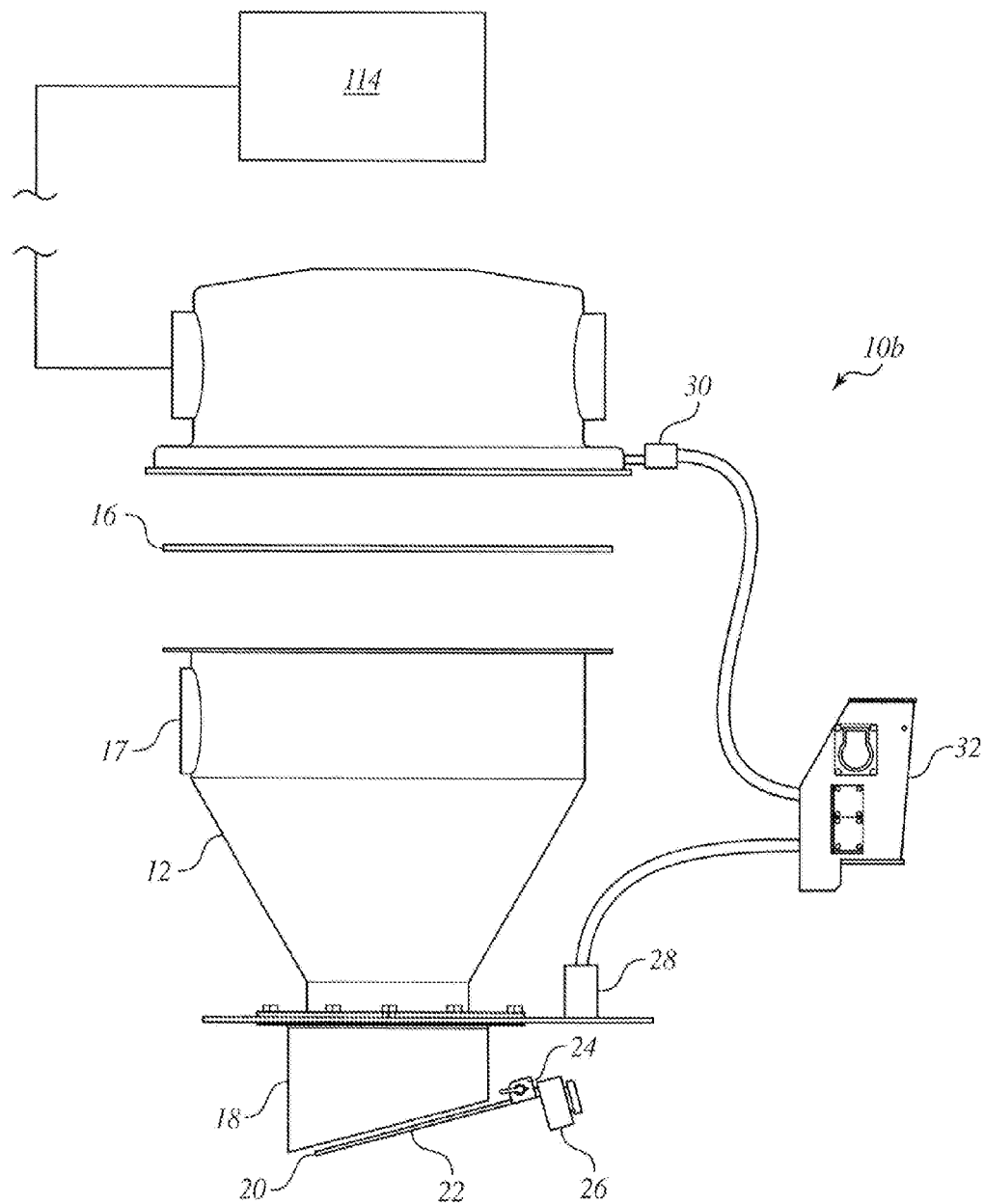
FIG. 4b shows an exploded side view of a vacuum loading system according to a vertical axis embodiment of the invention having a remote vacuum source.
Figure 5A:
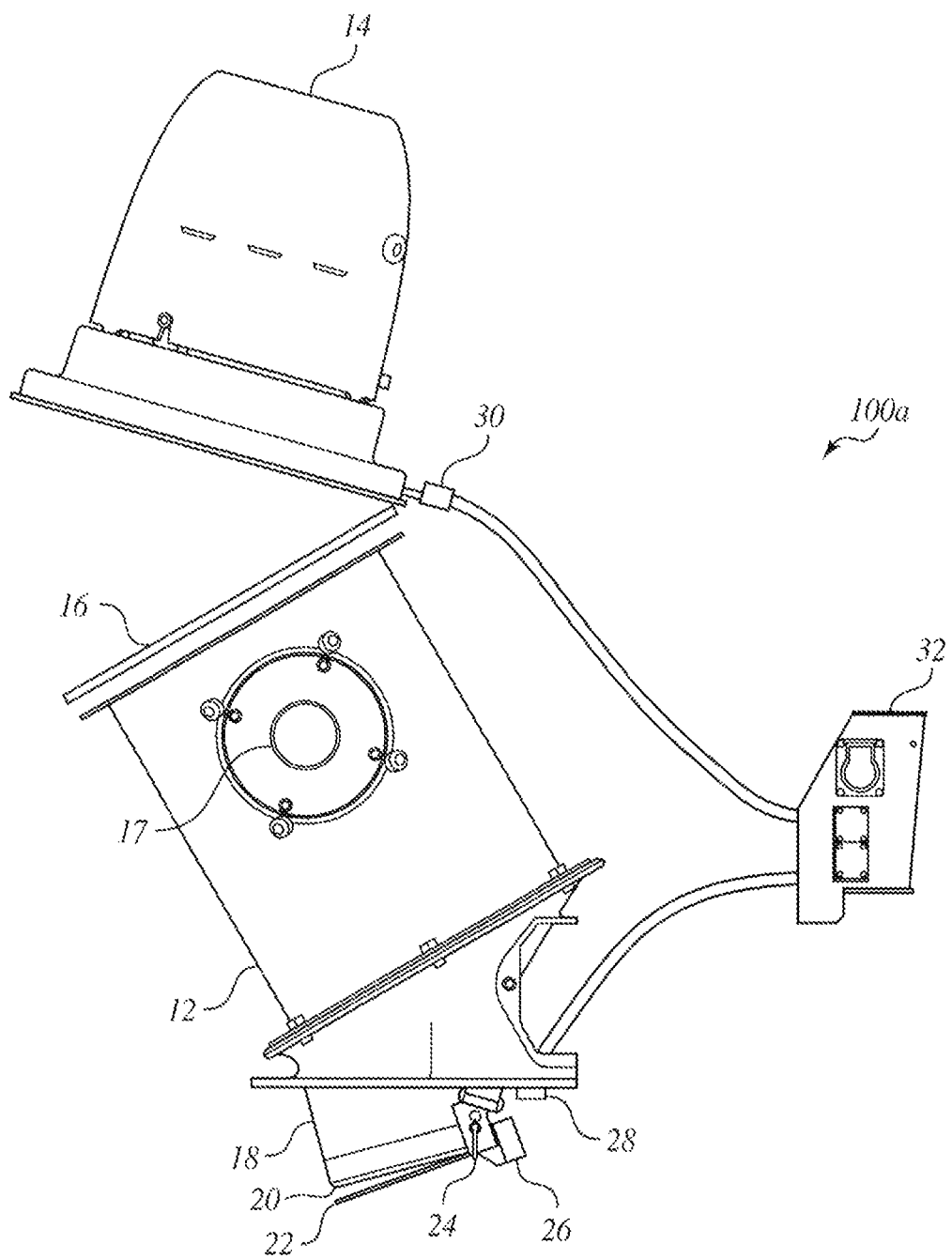
FIG. 5a shows an exploded side view of a vacuum loading system according to a tilted axis embodiment of the invention having a local vacuum source.
Figure 5B:
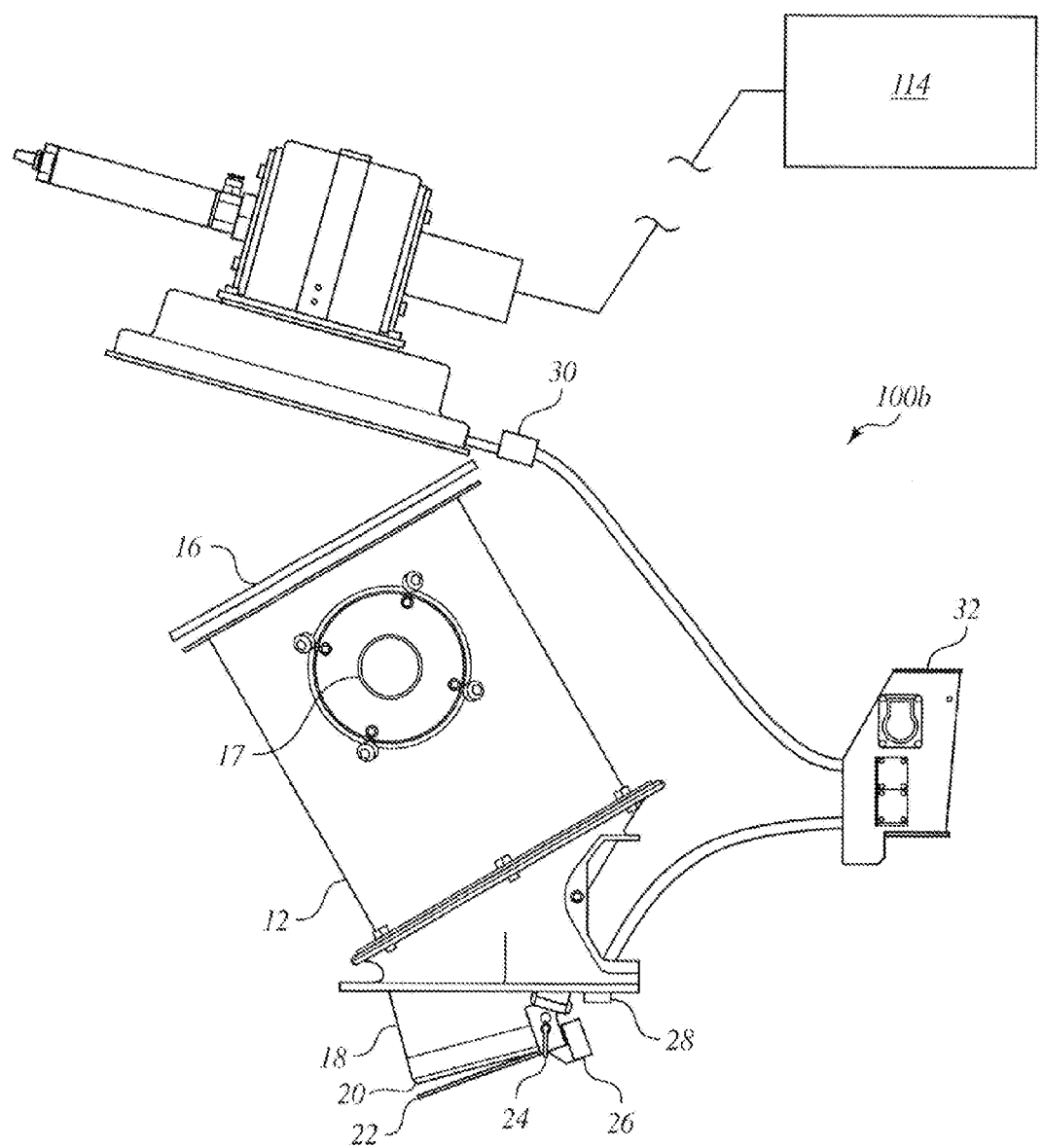
FIG. 5b shows exploded side view of a vacuum loading system according to a tilted axis embodiment of the invention having a remote vacuum source.

Alternative embodiments are shown in FIGS. 4b to 5b. Referring to FIG. 4b, an embodiment is shown of a central vacuum hopper loader 10b having a vertical axis and a remote vacuum source 114. Referring to FIG. 5a, an embodiment is shown of a vacuum hopper loader 100a having a vertical axis and an integral local vacuum source 14. Referring to FIG. 5b, an embodiment is shown of a central vacuum hopper loader 100b having a tilted axis and a remote vacuum source 114. The tilted hopper loader 100a, 100b typically provides easier access to the interior of the hopper loader for cleaning. The tilted hopper loader 100a, 100b is tilted at a fixed angle which allows easier access to the interiors of the hopper loader 100a, 100b than the vertical axis hopper loader 10a, 10b. FIGS. 5a and 5b show valve plate 22 in an open position while FIGS. 4a and 4b show valve plate 22 in a closed position. Other than the orientation of the axes of the hopper loaders, and the type of vacuum source, the components and operation of the hopper loaders are the same and like components, therefore, have been identified with like reference numerals.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered by way of example only to facilitate comprehension of the invention and should not be construed to limit the scope thereof.

What is claimed is:

1. A hopper loader comprising:
a hopper having a material inlet, said inlet connected to a conduit;

a vacuum source connected to the hopper for applying a vacuum to the hopper to convey material into the hopper through the material inlet;

a material separator disposed between the material inlet and the vacuum source for filtering the material;

a material discharge assembly connected to the hopper and disposed for controlling downwardly gravity flow of the material from the hopper, the material discharge assembly having a material outlet configured to be opened and closed to control the discharge of material from the hopper;

a demand sensor configured for sensing whether the material outlet is closed;

a vacuum detector disposed between the material separator and the vacuum source, and configured for detecting the vacuum in the hopper and for producing a signal in response to a minimum increase above a steady state level in the vacuum detected;

a vacuum activated control operatively connected to the vacuum detector and the demand sensor, wherein the vacuum activated control is configured to turn on the vacuum source in response to a signal from the demand sensor indicating that the material outlet is closed, and wherein the vacuum activated control is configured to turn off the vacuum source in response to the signal from the vacuum detector indicating that the hopper is full.

2. The hopper loader of claim 1, wherein the vacuum source is integral with the hopper.

3. The hopper loader of claim 1, wherein the vacuum source is remote from the hopper.

4. The hopper loader of claim 1, wherein the hopper has a vertical axis.

5. The hopper loader of claim 1, wherein the hopper has a tilted axis.

6. The hopper loader of claim 1, wherein the material discharge assembly comprises a pivotally mounted valve plate biased to a closed position.

7. The hopper loader of claim 6, wherein the material discharge assembly further comprises a magnetic counterweight biasing the valve plate to a closed position, and wherein the demand sensor senses the presence of the magnetic counterweight.

* * * * *